United States Patent [19]

Takayama

[11] Patent Number: 5,442,807
[45] Date of Patent: Aug. 15, 1995

[54] MOBILE COMMUNICATION SYSTEM WITH CELL SITE SELECTION FOR DISPERSION OF TRAFFIC

[75] Inventor: Yoshikazu Takayama, Tokyo, Japan
[73] Assignee: NEC Corporation, Tokyo, Japan
[21] Appl. No.: 233,621
[22] Filed: Apr. 26, 1994
[30] Foreign Application Priority Data

Apr. 26, 1993 [JP] Japan .................................. 5-120417

[51] Int. Cl.$^6$ .......................... H04B 7/26; H04Q 7/38
[52] U.S. Cl. .................................. 455/33.1; 455/33.4; 455/34.1; 455/54.2; 455/56.1; 379/59
[58] Field of Search ............ 455/33.1, 33, 2, 33.4, 455/34.1, 54.1, 54.2, 56.1, 62; 379/57, 58, 59-61

[56] References Cited

U.S. PATENT DOCUMENTS

| | | | |
|---|---|---|---|
| 5,241,686 | 8/1993 | Charbonnier | 455/33.2 |
| 5,313,652 | 5/1994 | Rozenstrauch et al. | 455/34.1 X |
| 5,349,632 | 9/1994 | Nagashima | 455/34.1 X |
| 5,363,428 | 11/1994 | Nagashima | 455/33.1 X |

*Primary Examiner*—Edward F. Urban
*Assistant Examiner*—Chi H. Pham
*Attorney, Agent, or Firm*—Whitham, Curtis, Whitham & McGinn

[57] ABSTRACT

In a cellular communication system, a mobile station detects field intensities of surrounding cell sites and transmits a report signal to one of the surrounding cell sites having highest field intensity. Each cell site detects the channel occupancy of its speech channels in response to a connection request from a home cell site and returns a response indicating whether the request is to be granted or not depending on the channel occupancy. The home cell site is responsive to the report signal for assigning priorities to the surrounding cell sites according to its channel occupancy and selects one of the surrounding cell sites according to the assigned priorities. If the home cell site is not selected, it sends a connection request to the selected cell site for receiving a response. If it is selected, it determines whether a speech channel is available or not depending on its channel occupancy. A channel identifier is transmitted to the mobile station if the response from the selected cell sites indicates that the connection request is granted or if the speech channel is determined to be available. If the response indicates that the request is not granted or if there is no speech channel available, cell sites of lower priority are successively selected and the process is repeated. A busy signal will be sent to the mobile station if the repeated attempts fall.

11 Claims, 6 Drawing Sheets

| MESSAGE TYPE | O/G OR I/C |
|---|---|
| HOME CELL SITE FIELD INTENSITY (CELL 11) | 30 dBμv |
| NO. OF CANDIDATE CELLS | 5 |
| CONTROL CHANNEL (CELL 20) | CHA. NO |
| FIELD INTENSITY (CELL 20) | 25 dBμv |
| CONTROL CHANNEL (CELL 25) | CHA. NO |
| FIELD INTENSITY (CELL 25) | 22 dBμv |
| CONTROL CHANNEL (CELL 10) | CHA. NO |
| FIELD INTENSITY (CELL 10) | 20 dBμv |
| CONTROL CHANNEL (CELL 23) | CHA. NO |
| FIELD INTENSITY (CELL 23) | 18 dBμv |

FIG. 5

| HOME CELL CHANNEL OCCUPANCY | LESS THAN 10% | EQUAL TO OR MORE THAN 10% |
|---|---|---|
| HOME CELL | 1 | 2 |
| OTHER GREATER CELLS | 3 | 3 |
| SMALLER CELLS | 2 | 1 |

| HOME CELL CHANNEL OCCUPANCY | LESS THAN 90% | EQUAL TO OR MORE THAN 90% |
|---|---|---|
| HOME CELL | 1 | 2 |
| GREATER CELLS | 3 | 3 |
| OTHER SMALLER CELLS | 2 | 1 |

| PRIORITY | CELL |
|---|---|
| 1 | 20 |
| 2 | 25 |
| 3 | 23 |
| 4 | 11 |
| 5 | 10 |

FIG. 8

| CHANNEL OCCUPANCY OF GREATER CELL (%) | 0≤, <50 | 50≤, <90 | 90≤, <100 | 100 |
|---|---|---|---|---|
| REQUEST FROM GREATER CELL | ○ | ○ | ○ | × |
| REQUEST FROM SMALLER CELL | ○ | × | × | × |
| REQUEST FROM HOME CELL | ○ | ○ | ○ | × |

| CHANNEL OCCUPANCY OF SMALLER CELL (%) | 0≤, <50 | 50≤, <90 | 90≤, <100 | 100 |
|---|---|---|---|---|
| REQUEST FROM GREATER CELL | ○ | ○ | ○ | × |
| REQUEST FROM SMALLER CELL | ○ | ○ | ○ | × |
| REQUEST FROM HOME CELL | ○ | ○ | ○ | × |

LEGEND: ○ GRANT  × REJECT

MOBILE COMMUNICATION SYSTEM WITH CELL SITE SELECTION FOR DISPERSION OF TRAFFIC

BACKGROUND OF THE INVENTION

1. Field of the Invention

The present invention relates generally to cellular mobile communication systems, and more specifically to a technique to prevent concentration of traffic in particular cell sites.

2. Description of the Related Art

In a known cellular mobile communication system, a mobile station is constantly making a search through the control channels of surrounding cell sites during a standby mode and tuning its frequency synthesizer to the control channel of highest field intensity. The cell site that uses that control channel is the home cell site for the mobile station. When placing a call, the mobile station sends a call request on the presently turned control channel to the home cell site to cause it to search through its channel resource for an idle speech channel. If the home cell site fails to locate an idle speech channel, it proceeds to make a search through the channel resource of an adjacent cell site. However, traffic concentration tends to occur in a particular cell site if the channel search is made without taking into account the usage of speech channels of the adjacent cell site. If the system covers an area where cells of smaller size are bordering on or partially overlapping cells of larger size, severe traffic concentration might occur in one or more greater cells due to the possibly large number of mobile stations in the greater cells in comparison with those in smaller cells. To meet such traffic demand, additional frequency resource must be allocated to the greater cells. Because of the high transmission power, the additional resource allocation results in an inefficient frequency reuse plan and a loss of frequencies which could otherwise be reused for remote cell sites.

SUMMARY OF THE INVENTION

It is therefore an object of the present invention to provide a cellular mobile communication system capable of dispersing traffic over cell sites to prevent concentration of traffic in one or more particular cell sites.

It is another object of the present invention to provide a cellular mobile communication system for covering an area where smaller and greater cells are bordering or partially overlapping each other while preventing severe traffic concentration in the greater cells.

It is a further object of the present invention to provide a cellular mobile communication system which ensures frequency utilization efficiency by preventing greater cells from using additional frequency resource in an area where they border on or partially overlap smaller cells.

According to a broader aspect, a mobile station detects field intensities of surrounding cell site stations and transmits a report signal to one of the surrounding cell site stations whose field intensity is highest in order to communicate the identities of the surrounding cell site stations. Each of a plurality of cell site stations has a plurality of speech channels and detects the channel occupancy of the speech channels of the cell site station in response to a connection request from a home cell site station and returns thereto a response indicating whether the connection request is to be granted or not depending on the channel occupancy. The home cell site station is responsive to the report signal for assigning priorities to the surrounding cell site stations identified by the signal according to the occupancy of the speech channels of the home cell site station. One of the surrounding cell site stations is selected according to the assigned priorities. If the home cell site station is not selected, it sends a connection request to the selected cell site station for receiving a response therefrom. If it is selected, it determines whether a speech channel is available or not depending on its channel occupancy. A channel identifier is transmitted to the mobile station if the response from the selected cell site station indicates that the request is granted or if there is a speech channel available. If the response indicates otherwise or if there is no speech channel available, a busy signal may be sent to the mobile station.

Preferably, if the attempt to find a speech channel fails, it is repeated on a cell site of lower priority until all the cell sites listed in the report signal are searched. A busy signal will be sent to the mobile station if the repeated attempts fail.

Since the cell sites are selected according to their assigned priorities and their channel occupancies, concentration of traffic on particular cell sites is prevented, and the need to increase the channel resourece of such cell sites is eliminated.

According to a second aspect, the present invention provides a cellular mobile communication system for covering a plurality of smaller cells and a plurality of greater cells bordering on or partially overlapping the smaller cells. A mobile station detects field intensities of surrounding cell site stations and transmits a report signal to one of the surrounding cell site stations whose field intensity is highest for reporting thereto identities of the surrounding cell site stations. A plurality of cell site stations are located respectively in the smaller and greater cells. Each cell site station detects the channel occupancy of its speech channels in response to a connection request from a home cell site station and returns a response indicating whether the connection request is to be granted or not depending on the channel occupancy. The home cell site station comprises priority assignment means responsive to the report signal for assigning priorities to the surrounding cell site stations identified by the report signal according to the occupancy of the speech channels of the home cell site station. Selector means is provided for selecting one of the surrounding cell site stations according to the assigned priorities. Transmit/receive means transmits a connection request to the selected cell site station and receives a response therefrom if the home cell site station is not selected. Decision means is provided for determining whether a speech channel is available or not depending on the channel occupancy of the home cell site station if the home cell site station is selected. A channel identifier is sent to the mobile station if the response from the selected cell site station indicates that the request is granted or if the speech channel is determined to be available, and a busy signal is sent to the mobile station if the response indicates that the request is not granted or if the speech channel is determined to be not available.

BRIEF DESCRIPTION OF THE DRAWINGS

The present invention will be described in further detail with reference to the accompanying drawings, in which.

DETAILED DESCRIPTION

Figure 1:
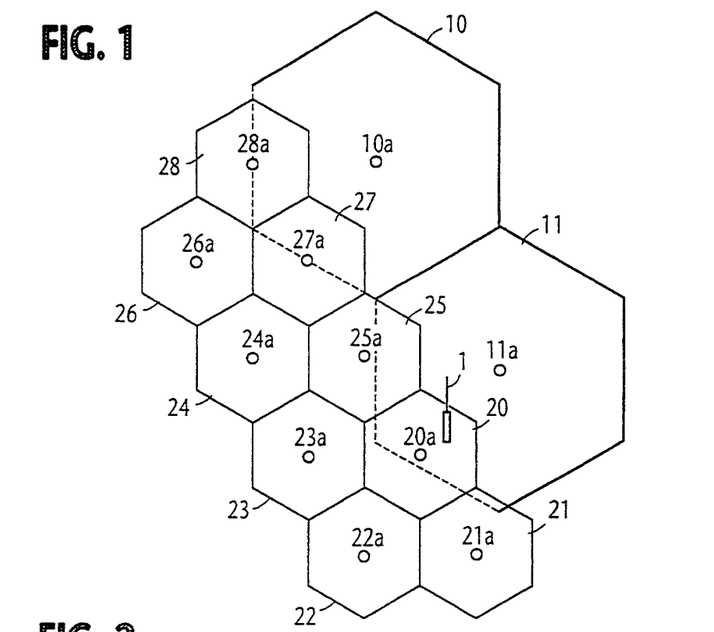
FIG. 1 shows a typical example of a service area of the cellular mobile communication system of this invention, wherein the service area is divided into a plurality of cells of different sizes overlapping each other and a typical mobile station is shown located in the overlapping zone and a cell site station is shown at the center of each cell.

In FIG. 1, the service area of a cellular mobile communication system according to this invention is shown as being divided into a plurality of greater cells 10 and 11 and a plurality of smaller cells 20 to 28 which border on or partially overlap the greater cells. A cell site station is located at the center of each cell as marked by the letter "a" attached to the numeral indicating the cell. The size of each cell is determined by the traffic density of the area it covers so that the smaller cell site stations provide a coverage of high density areas and the greater cell site stations provide a coverage of low density areas. As illustrated, the greater cell 10 may overlap with smaller cells 27 and 28 and greater cell 11 with smaller cells 20, 21 and 25.

Figure 2:
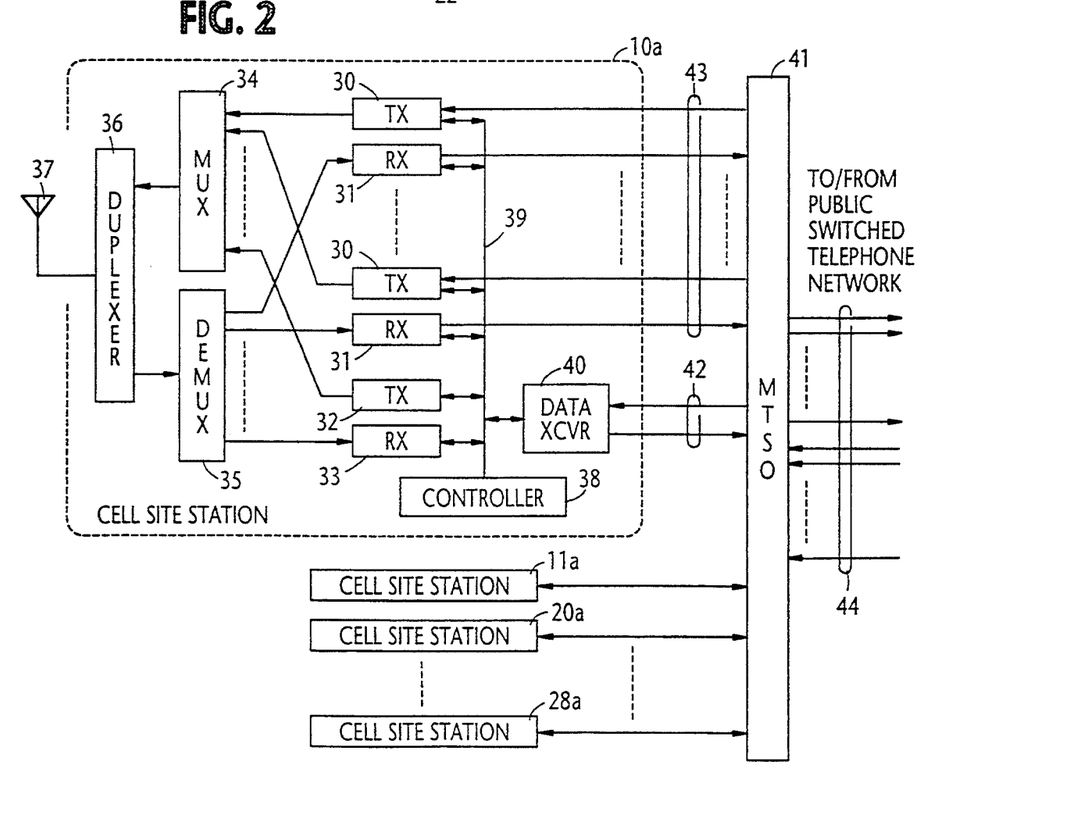
FIG. 2 shows in block diagram form the cell site stations connected to a mobile telephone switching office.

As illustrated in FIG. 2, each cell site station comprises a plurality of speech-channel transmitters 30 and a corresponding number of speech-channel receivers 31, and a pair of control-channel transmitter 32 and a control-channel receiver 33. The outputs of all the transmitters are connected to a multiplexer 34 where they are multiplexed to the input of a duplexer 36 for transmission from antenna 37. A signal received by the antenna is coupled to a demultiplexer 35 where it is demultiplexed into baseband signals for coupling to respective receivers. A controller 38 is connected to all the transmitters and receivers through a data bus 39. The controller is a microprocessor-based controller which includes a CPU, read-only memory that stores an operating program, and a random access memory where a cell priority table and a channel availability table are created in a manner as will be described.

A call request signal from mobile stations is carried on the control channel and supplied to the controller 38 where it is processed by referencing to the tables and transmitted by a data transceiver 40 through land-lines 42 to a mobile telephone switching office 41, which is connected by lines 44 to a public switched telephone network, not shown. The control signal from the data receiver 40 is supplied to any other cell site stations of the system through the MTSO. The input signals to the speech-channel transmitters 30 and the output signals from speech-channel receivers 31 are carried on land-lines 43 to the MTSO 41 and thence to the telephone network or other cell site stations. The transmission power of each cell site station is proportional to the size of the area it covers.

Figure 3:
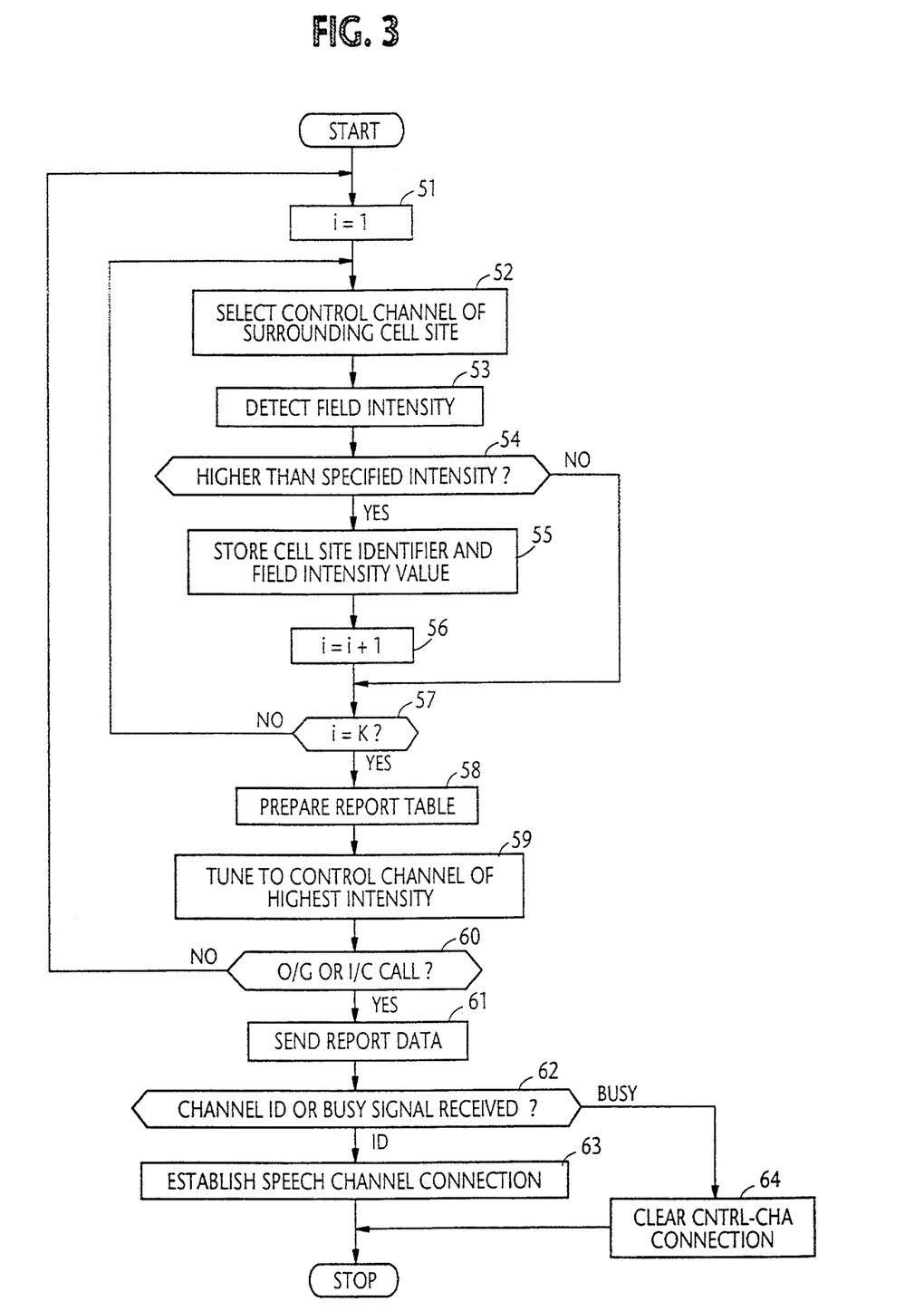
FIG. 3 shows in flow diagram form a sequence of programmed instructions executed by the mobile station when a speech channel connection is established.

Each cell site station transmits idle/busy status information on the control channel. As illustrated in FIG. 3, during the standby mode, the mobile station scans across the control channels of all surrounding cell site stations to determine their field intensities. This is done by setting a variable i to 1 (step 51) and selecting the control channel of a surrounding cell site station (step 52) and tuning the frequency synthesizer of the mobile station to the selected control channel to receive a control signal which contains the identifier of the cell site. The field intensity of the selected control channel is measured (step 53) and compared with a specified intensity level (step 54). If the measured value is higher than the specified intensity, control branches to step 55 to store the identifier of the cell site and the measured field intensity value in memory and variable i is incremented at step 56. checked for equality to a predetermined number K, where K is equal to the number of cell sites reported. If i is not equal to K, steps 52 to 57 are repeated until variable i is equal to K.

If the decision at step 57 is affirmative, control branches to step 58 to prepare a report table. If the measured field intensity is lower than the specified intensity, steps 55 and 56 are skipped to ignore the low intensity channel.

Figure 4:
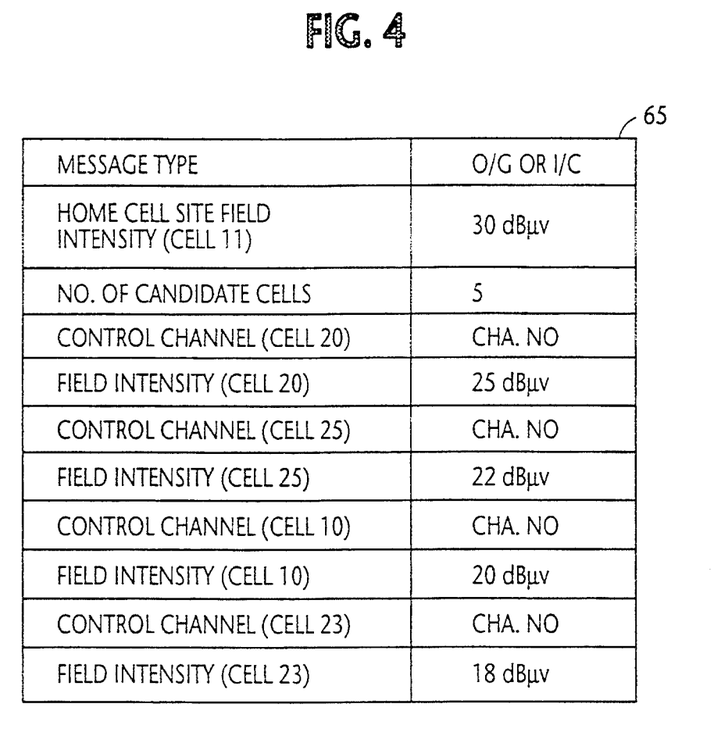
FIG. 4 shows the contents of a report signal sent from a mobile station to a home cell site station.

A typical example of the report table is shown at 65 in FIG. 4, assuming that a mobile station 1 is located in the overlapping area of cells 11 and 20 and is receiving the strongest control signal (30 dB$\mu$v) from cell site 11a. As such, cell site 11a is given as a home cell site in report table 65. It is assumed that the field intensity levels of control signals from cell sites 20a, 25a, 10a and 23a are 25 dB$\mu$v, 22 dB$\mu$v, 20 dB$\mu$v and 18 dB$\mu$v, respectively, and the number of these cell sites as candidates is given as 5 in the report table.

At step 59, the mobile station is tuned to the frequency of the highest intensity to use it as the control channel of a home cell site. At step 60, the mobile station determines whether there is an outgoing call from the mobile owner or an incoming call from the home cell site. If the answer is negative, control returns to step 51 to repeat the above process. Otherwise, it branches to step 61 to insert the message type of the call into the table 65 and transmits a report signal containing the data of report table 65. At step 62, control checks to see if a channel identifier is received or a busy signal is received. If a channel identifier is received, control branches to step 63 to establish a speech channel connection to the cell site which has granted the request, and if a busy signal is received, it clears the control channel connection (step 64).

Figure 5:
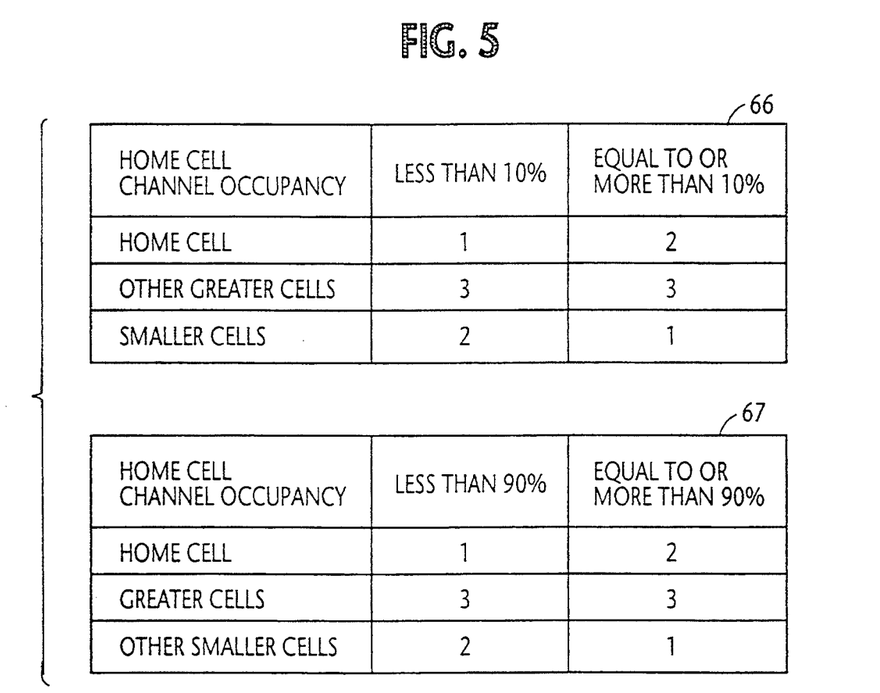
FIG. 5 shows priority tables respectively used by cell site stations of greater and smaller cells.

In response to the report signal from a mobile station, the home cell site station selects one of the candidate cell sites given by the report signal according to cell site priority and field intensities given by the report data. For this purpose, greater cell sites and smaller cell sites define a priority tables 66 and 67, respectively, as shown in FIG. 5. Each priority table defines priority values for different cell site categories (home cell, other greater cell and smaller cell) depending on a threshold value of the channel occupancy of the home cell site, i.e., the ratio of the number of speech channels in use to the total number of the speech channels.

In the case of greater cell sites, for less than 10% occupancy, home cell site is given the highest priority to be selected from the candidate cells, smaller cell sites are given second priority and other greater cell sites are given the lowest priority. For channel occupancy equal to or more than 10%, the highest priority is given to smaller cells, the second priority to home cell and the lowest priority to other greater cells.

In the case of smaller cell sites, for less than 90% channel occupancy, the highest priority is given to home cell site, the second priority to smaller cell sites, and the lowest priority to other greater cell sites, and for occupancy equal to or more than 90%, the highest priority is given to smaller cells, the second priority to home cell and the lowest priority to other greater cells.

Figure 6:
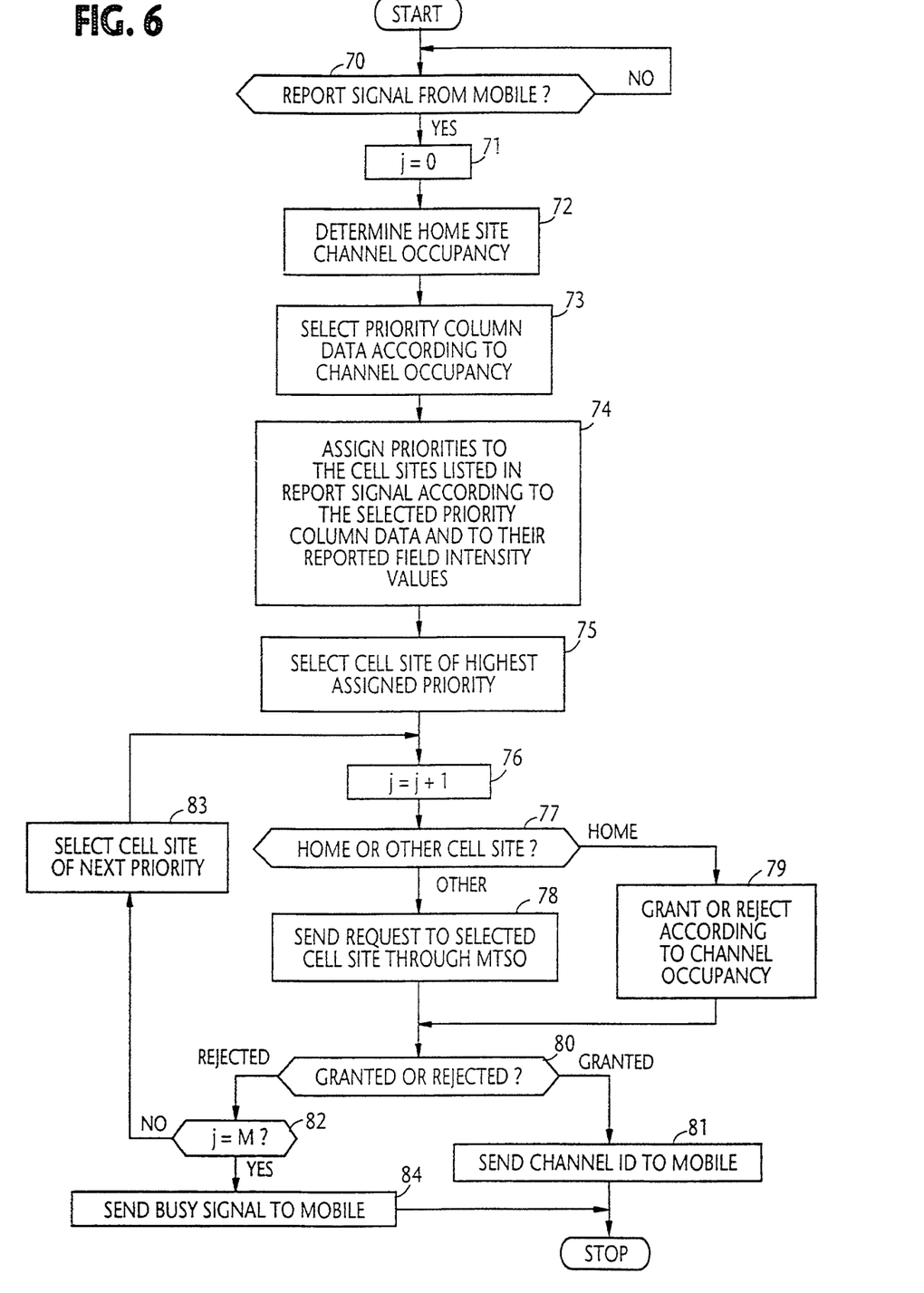
FIG. 6 shows in flow diagram form a sequence of programmed instructions executed by the controller of each cell site station when operating as a home cell site.
Figure 7:
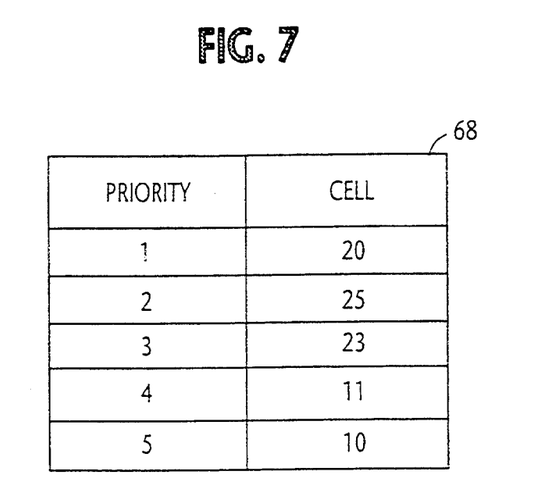
FIG. 7 shows an assigned priority table prepared by the home cell site station in response to a report signal.

Controller 38 of each cell site station is programmed to perform a sequence of instructions as illustrated in FIG. 6. The program execution starts with decision step 70 which checks to see if a report signal is received from a mobile station. If it is, control branches to step 71 to set variable j to 0 and proceeds to step 72 to determine the home site speech channel occupancy. Exit then is to step 73 to select one of the right and left column data of the priority table 66 (or 67) according to the channel occupancy. By using the selected priority column data and the field intensities listed in the received report signal, priorities are assigned to the cell sites of the report signal (step 74). Since the cell site 11a is the home cell site for mobile station 1, priority table 66 is used. If the channel occupancy is equal to or higher than 10%, the right priority column data is selected to assign highest priority to cells 20, 23 and 25, second priority to cell 11 and lowest priority to cell 10. In addition, different priorities are assigned respectively to the listed smaller cells according to their field intensities indicated by the reported signal. Therefore, an assigned priority table 68 will be produced by cell site station 11a as shown in FIG. 7.

Control proceeds to step 75 to select one of the listed cell sites which is assigned the highest priority, i.e., cell site 20a. Exit then is to step 76 to increment variable j by one. At step 77, control determines whether the selected cell site is the home or other cell site. If an adjacent cell site is selected, control exits to step 78 to send a connection request signal to the selected cell site through the MTSO 41 (i.e., from cell site 11a to cell site 20a in the example case). If the selected cell site is the home cell site, control branches at step 77 to step 79 to determine whether the request is to be granted or rejected according to the occupancy of the speech channels of the home cell site using a channel availability table to be described later and produces a response indicating the identifier of an available speech channel to be used for the requesting mobile station.

If the cell site receives a connection request from an adjacent cell, a response is returned to it indicating whether the request is granted or rejected. On receiving a response either from an adjacent or home cell site (step 80), control checks to see if the request is granted or rejected. If it is granted, control branches at step 80 to step 81 to send a channel identifier received from the selected cell site to the mobile station to allow it to establish a speech-channel connection to the selected cell site, and clears down the control channel connection to the mobile station.

If the request for connection is rejected by a subsequently selected cell site, control branches at step 80 to step 82 to check for equality j=M (where M represents the number of candidate cells). If j is not equal to M, control branches at step 82 to step 83 to select a cell site of next priority, i.e., cell site 25a and j is incremented by one at step 76 and a request signal is sent to cell site station 25a. If the request is rejected again, steps 76, 77, 78, 80, 82 and 83 will be repeated again. In this way, if requests to subsequent cell sites 23a, 11a and 10a are rejected, the variable j will become equal to M (where M is the number of candidate cells indicated by the report signal) at step 82, and control exits to step 84 to send a busy tone to the requesting mobile station and ends the program execution.

Figure 8:
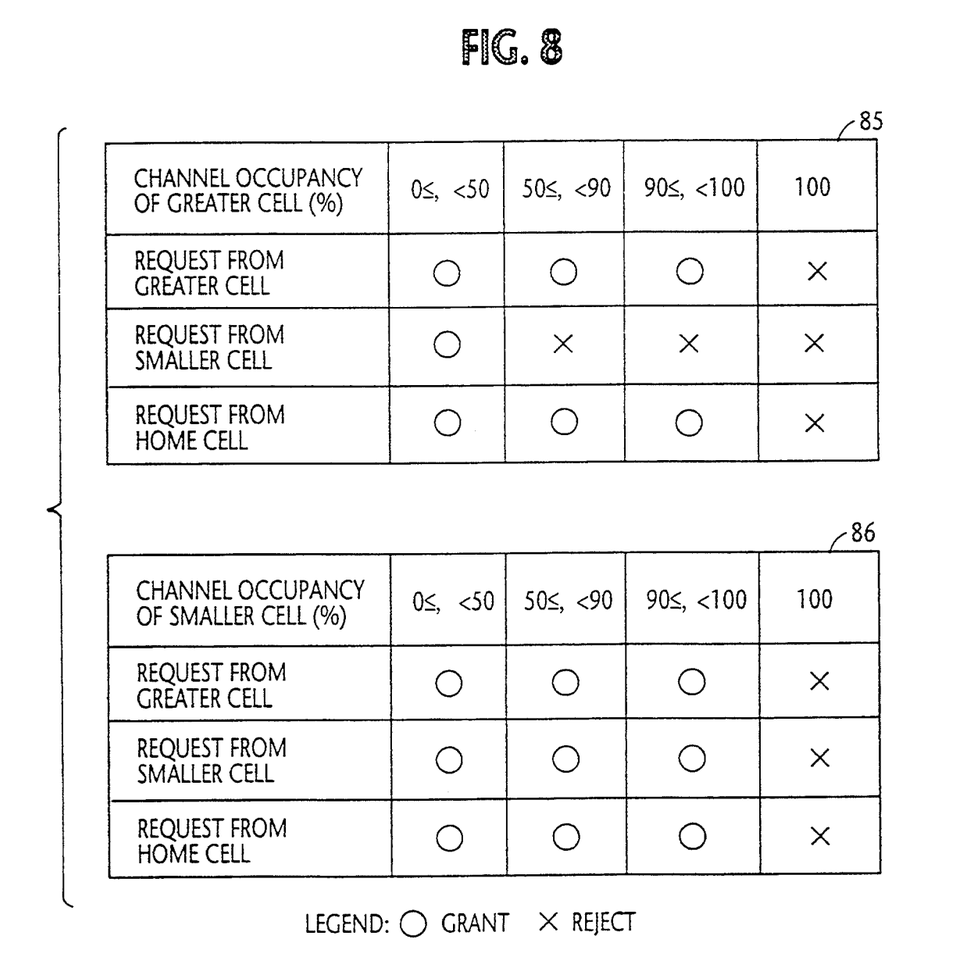
FIG. 8 shows channel availability tables used respectively by cell site stations of greater and smaller cells.

As shown in FIG. 8, each greater cell site is provided with a channel availability table 85 and each smaller cell site with a channel availability table 86. Each channel availability table provides "grant" or "reject" indications in a matrix of rows and columns, with rows corresponding respectively to different sources of request and with columns corresponding respectively to different ranges of channel occupancies. In the case of greater cells, for a range of 0 to 50% channel occupancy, request from any source is granted and for a range of 50 to 100%, request from greater cells and home cell are granted, but requests from smaller cells are rejected. At 100% occupancy, request from any source is rejected. In the case of smaller cells, requests from any source are granted for the range between 0 and 100%, but rejected at 100% occupancy.

Figure 9:
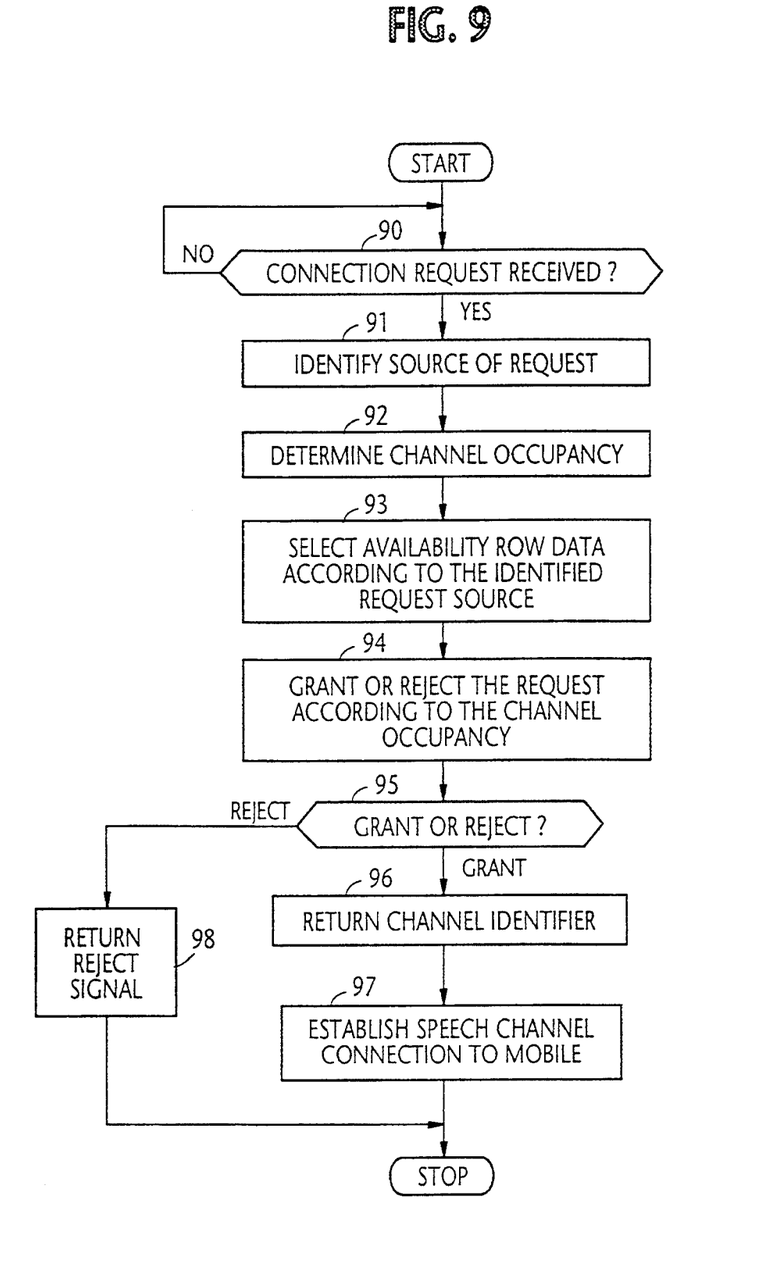
FIG. 9 shows in flow diagram form a sequence of programmed instructions executed by the controller of each cell site station when it is selected by the home cell site station.

Controller 38 of each cell site station is further programmed to perform a sequence of instructions as illustrated in FIG. 9. The program execution starts with decision step 90 to check to see if a request for connection is received from an adjacent cell site. If it is, control branches to step 91 to identify the source of the request signal. Control proceeds to step 92 to determine the speech channel occupancy of the cell site. Exit then is to step 93 to select one of the row data of the availability table 85 (or 86) according to the identified cell site. Exit then is to step 94 to grant or reject the connection request depending on the determined channel occupancy. If the connection request is granted (step 95), control proceeds to step 96 to return a grant signal containing the identifier of an available speech channel to the requesting cell site and a speech channel connection is established between the selected cell site and the mobile station (step 97).

If the request is rejected (step 95), control branches to step 98 to return a reject indication signal to the requesting cell site.

Since cell sites are selected according to their assigned priorities and their channel occupancies, concentration of traffic on particular cell sites is effectively prevented, eliminating the need to increase the call handling capacity of such cell sites. This is particularly advantages for greater cells since increasing the call handling capacity would require new frequency resource which could otherwise be reused by remote cell sites.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A cellular mobile communication system for covering a plurality of cells, comprising:
   a mobile station for detecting field intensities of surrounding cell site stations and transmitting a report signal to one of the surrounding cell site stations whose field intensity is highest for reporting thereto identities of said surrounding cell site stations; and
   a plurality of cell site stations located respectively in said cells, each of said cell site stations having a plurality of speech channels and including means for detecting channel occupancy of the speech channels of the cell site station in response to a connection request from a home cell site station and returning thereto a response indicating whether the connection request is to be granted or not depending on the channel occupancy, one of said cell site stations becoming said home cell site station whenever said report signal is received, wherein the home cell site station comprises:
   priority assignment means responsive to said report signal for assigning priorities to the surrounding cell site stations identified by the report signal according to the occupancy of the speech channels of the home cell site station;
   selector means for selecting one of said surrounding cell site stations according to the assigned priorities;
   transmit/receive means for transmitting said connection request to said selected cell site station and receiving said response therefrom, if the home cell site station is not selected;
   decision means for determining whether a speech channel is available or not depending on the channel occupancy of the home cell site station if the home cell site station is selected; and
   means for transmitting a channel identifier to said mobile station if the response from the selected cell site station indicates that the connection request is granted or if the speech channel is determined to be available by the decision means, and transmitting a busy signal to said mobile station if said response indicates that the connection request is not granted or if said speech channel is determined to be not available.

2. A cellular mobile communication system as claimed in claim 1, wherein said priority assignment means includes means for assigning higher priority to said home cell site station in comparison with other surrounding cell site stations if said channel occupancy is lower than a predetermined value and assigning lower priority to said home cell site station in comparison with the other cell site stations if said channel occupancy is higher than the predetermined value.

3. A cellular mobile communication system as claimed in claim 1, wherein said report signal indicates the detected field intensities of said surrounding cell site stations, and wherein said priority assignment means includes means for assigning said priorities according to the detected field intensities.

4. A cellular mobile communication system as claimed in claim 1, wherein said selector means includes means for successively selecting ones of said surrounding cell site stations having lower priorities if said request is not granted or if said speech channel is determined to be not available and said transmit/receive means includes means for further transmitting said connection request successively to the selected ones of said surrounding cell site stations for successively receiving responses therefrom.

5. A cellular mobile communication system for covering a plurality of smaller cells and a plurality of greater cells bordering on or partially overlapping said smaller cells, comprising:
   a mobile station for detecting field intensities of surrounding cell site stations and transmitting a report signal to one of the surrounding cell site stations whose field intensity is highest for reporting thereto identities of said surrounding cell site stations; and
   a plurality of cell site stations located respectively in said smaller and greater cells, each of said cell site stations having a plurality of speech channels and including means for detecting channel occupancy of the speech channels of the cell site station in response to a connection request from a home cell site station and returning thereto a response indicating whether the connection request is to be granted or not depending on the channel occupancy, one of said cell site stations becoming said home cell site station whenever said report signal is received, wherein the home cell site station comprises:
   priority assignment means responsive to said report signal for assigning priorities to the surrounding cell site stations identified by the report signal according to the occupancy of the speech channels of the home cell site station;
   selector means for selecting one of said surrounding cell site stations according to the assigned priorities;
   transmit/receive means for transmitting said connection request to said selected cell site station and receiving said response therefrom, if the home cell site station is not selected;
   decision means for determining whether a speech channel is available or not depending on the channel occupancy of the home cell site station if the home cell site station is selected; and
   means for transmitting a channel identifier to said mobile station if the response from the selected cell site station indicates that the connection request is granted or if the speech channel is determined to be available by the decision means, and transmitting a busy signal to said mobile station if said response indicates that the connection request is not granted or if said speech channel is determined to be not available.

6. A cellular mobile communication system as claimed in claim 5, wherein said priority assignment means of the home cell site station located in one of the greater cells comprises:
   means for assigning first priority to said home cell site station, second priority to the cell site stations of the smaller cells and third priority to the cell site stations of the greater cells if said channel occupancy is lower than a first threshold value, and assigning first priority to the cell site stations of the smaller cells, second priority to said home cell site station and third priority to the cell site stations of the greater cells if said channel occupancy is higher than the first threshold value, wherein said priority assignment means of the home cell site station located in one of the smaller cells comprises:

means for assigning first priority to said home cell site station, second priority to the cell site stations of the smaller cells and third priority to the cell site stations of the greater cells if said channel occupancy is lower than a second threshold value higher than the first threshold value, and assigning first priority to the cell site stations of the smaller cells, second priority to said home cell site station and third priority to the cell site stations of the greater cells if said channel occupancy is higher than the second threshold value.

7. A cellular mobile communication system as claimed in claim 5, wherein said report signal indicates the detected field intensities of said surrounding cell site stations, and wherein said priority assignment means includes means for assigning said priorities according to the detected field intensities.

8. A cellular mobile communication system as claimed in claim 5, wherein said selector means includes means for successively selecting ones of said surrounding cell site stations having lower priorities if said request is not granted or if said speech channel is determined to be not available and said transmit/receive means includes means for further transmitting said connection request successively to the selected ones of said surrounding cell site stations for successively receiving responses therefrom.

9. In a cellular mobile communication system for covering a plurality of cells, comprising a mobile station for detecting field intensities of surrounding cell site stations and transmitting a report signal to one of the surrounding cell site stations whose field intensity is highest and a plurality of cell site stations located respectively in said cells, each of said cell site stations having a plurality of speech channels and including means for detecting channel occupancy of the speech channels of the cell site station in response to a connection request from a home cell site station and returning thereto a response indicating whether the connection request is to be granted or not depending on the channel occupancy, one of said cell site stations becoming said home cell site station whenever said report signal is received, said report signal reporting identities of said surrounding cell site stations, a method of operating said home cell site station comprising the steps of:

a) assigning priorities to the surrounding cell site stations identified by the report signal according to the channel occupancy of the speech channels of the home cell site station;

b) selecting one of said surrounding cell site stations having the highest of the priorities assigned by the step (a);

c) if the home cell site station is not selected, transmitting said connection request to said selected cell site station and receiving said response therefrom;

d) if the home cell site station is selected, determining whether a speech channel is available or not depending on the channel occupancy of the home cell site station;

e) if said response indicates that the connection request is granted or if the speech channel is determined to be available by the step (d), transmitting a channel identifier to said mobile station; and f) if said response indicates that the connection request is not granted or if the speech channel is determined to be not available by the step (d), selecting one of said surrounding cell site stations having lower priority of the assigned priorities and repeating the steps (c) to (f) until said channel identifier is transmitted to said mobile station, or transmitting a busy signal to said mobile station if the steps (c) to (f) are repeated a predetermined number of times.

10. A method as claimed in claim 9, wherein the step (a) comprises assigning higher priority to said home cell site station in comparison with other surrounding cell site stations if the channel occupancy of the home cell site station is lower than a predetermined value and assigning lower priority to said home cell site station in comparison with the other cell site stations if said channel occupancy is higher than the predetermined value.

11. In a cellular mobile communication system for covering a plurality of smaller cells and a plurality of greater cells bordering on or partially overlapping said smaller cells, comprising a mobile station for detecting field intensities of surrounding cell site stations and transmitting a report signal to one of the surrounding cell site stations whose field intensity is highest and a plurality of cell site stations located respectively in said smaller and greater cells, each of said cell site stations having a plurality of speech channels and including means for detecting channel occupancy of the speech channels of the cell site station in response to a connection request from a home cell site station and returning thereto a response indicating whether the connection request is to be granted or not depending on the channel occupancy, one of said cell site stations becoming said home cell site station whenever said report signal is received, said report signal reporting indentities of said surrounding cell site stations, a method of operating said home cell site station comprising the steps of:

a) assigning priorities to the surrounding cell site stations identified by the report signal according to the channel occupancy of the speech channels of the home cell site station;

b) selecting one of said surrounding cell site stations having the highest of the priorities assigned by the step (a);

c) if the home cell site station is not selected, transmitting said connection request to said selected cell site station and receiving said response therefrom;

d) if the home cell site station is selected, determining whether a speech channel is available or not depending on the channel occupancy of the home cell site station;

e) if said response indicates that the connection request is granted or if the speech channel is determined to be available by the step (d), transmitting a channel identifier to said mobile station; and f) if said response indicates that the connection request is not granted or if the speech channel is determined to be not available by the step (d), selecting one of said surrounding cell site stations having lower priority of the assigned priorities and repeating the steps (c) to (f) until said channel identifier is transmitted to said mobile station, or transmitting a busy signal to said mobile station if the steps (c) to (f) are repeated a predetermined number of times.

* * * * *